United States Patent [19]

Carrick

[11] Patent Number: 4,664,401
[45] Date of Patent: May 12, 1987

[54] BOAT TRAILER

[75] Inventor: Lawrence K. Carrick, Spokane, Wash.

[73] Assignee: Calkins Manufacturing Company, Spokane, Wash.

[21] Appl. No.: 774,047

[22] Filed: Sep. 9, 1985

[51] Int. Cl.$^4$ .............................................. B60P 3/10
[52] U.S. Cl. ................................ 280/414.1; 114/344; 280/656; 414/483
[58] Field of Search ............... 280/414.1, 414.2, 414.3, 280/656; 114/344; 414/482, 483

[56] References Cited

U.S. PATENT DOCUMENTS

| | | | |
|---|---|---|---|
| 2,608,418 | 8/1952 | Finlayson et al. | 280/414.1 X |
| 2,644,176 | 7/1953 | Livermon | 114/344 |
| 2,733,823 | 2/1956 | Evans | 280/414.1 X |
| 3,379,452 | 4/1968 | Torrisi | 280/414.1 X |
| 3,993,324 | 11/1976 | Carrick | 280/414.1 |
| 4,232,879 | 11/1980 | Boxrud | 280/414.1 X |
| 4,464,092 | 8/1984 | Chambers et al. | 280/414.1 X |

Primary Examiner—John J. Love
Assistant Examiner—Charles R. Watts
Attorney, Agent, or Firm—Wells, St. John & Roberts

[57] ABSTRACT

A boat trailer frame is described including an adjustable pair of elongated frame members extending from a tongue section to a wheel supported carriage. Bunks are mounted directly to the frame members. Forward ends of the frame members are pivotably mounted to the tongue and selectively clamped to the wheel carriage. Lateral adjustment of the distance between the frame members and bunks is provided to accommodate boat hulls of varying configurations. Such lateral adjustment is accomplished simply by pivoting the frame members together or apart about the forward pivots at the tongue. Clamps are included for selectively securing the frame members to the carriage assembly and tongue once a selected space between the bunks is achieved. Other clamps are used to facilitate longitudinal adjustment of the wheel carriage position along the frame members to adjust "tongue weight".

8 Claims, 10 Drawing Figures

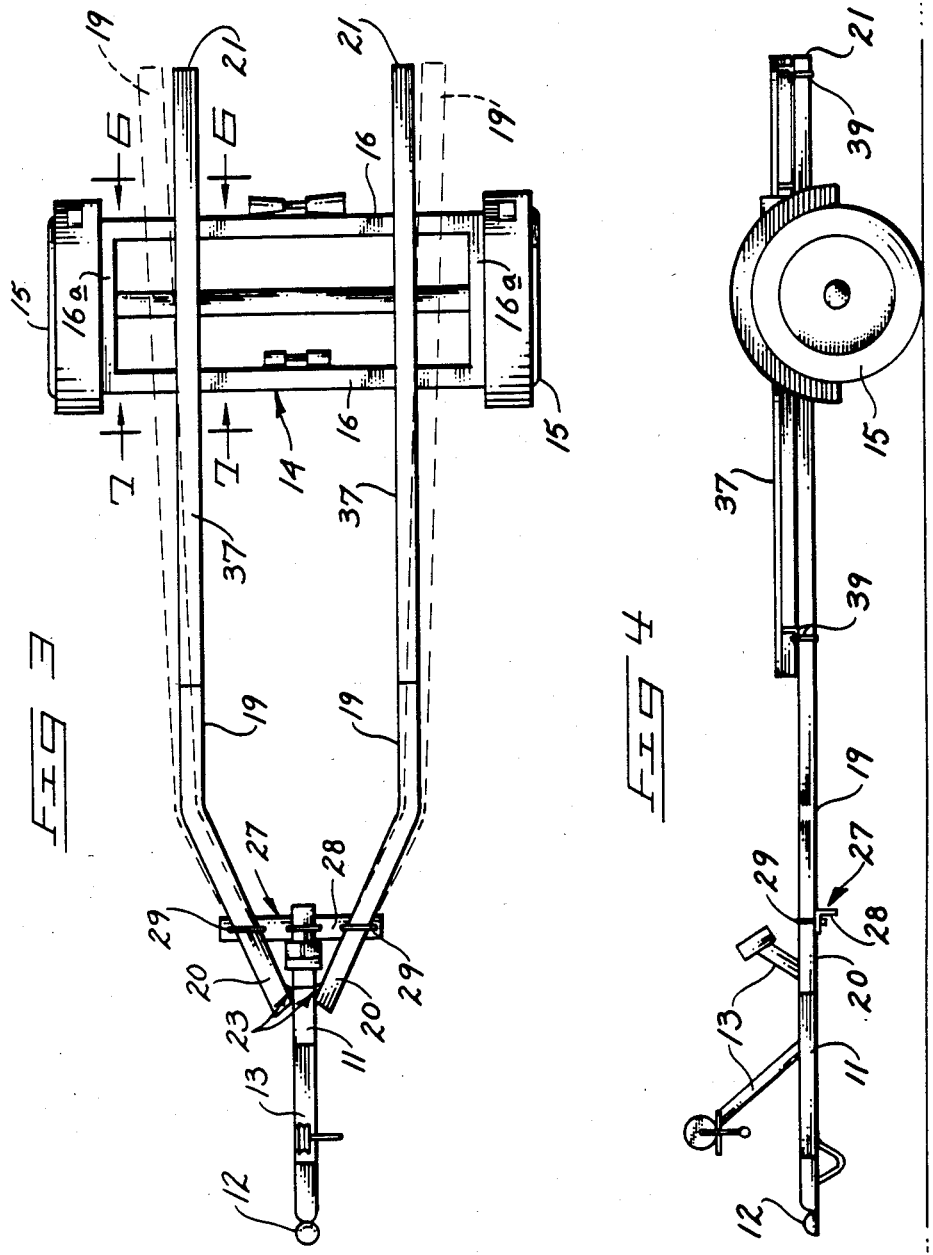

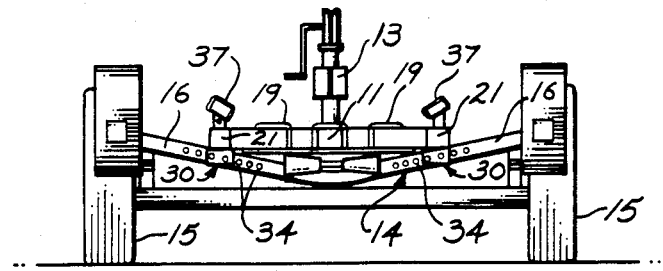
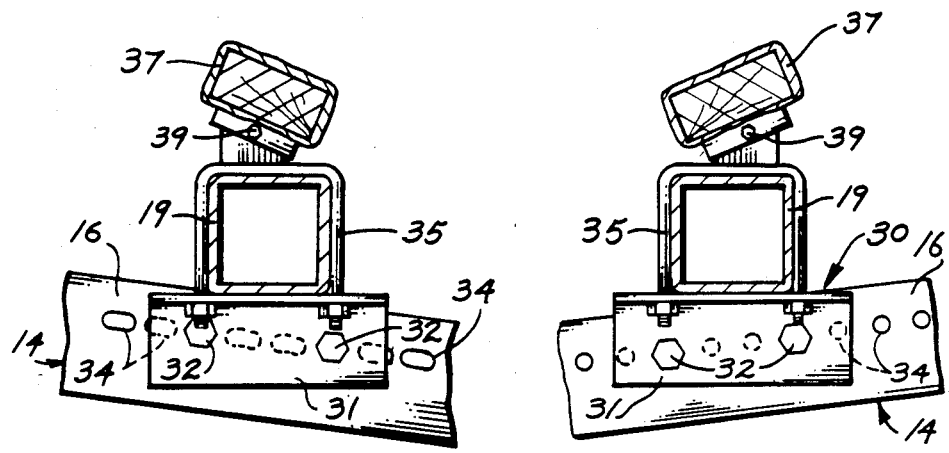
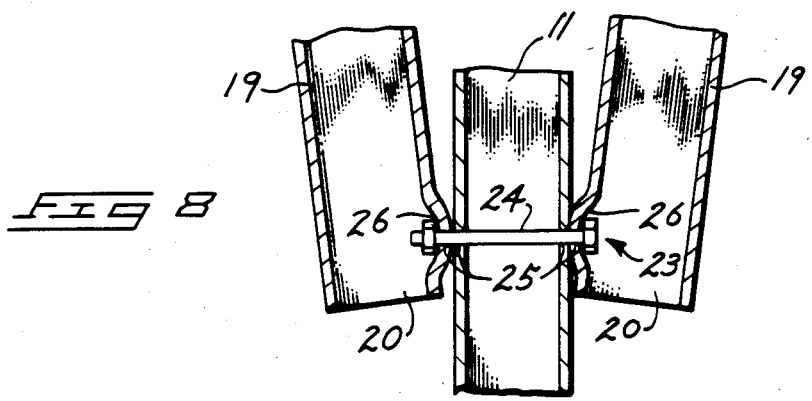

BOAT TRAILER

FIELD OF THE INVENTION

The present invention relates to adjustable support for boats on wheel supported trailers.

BACKGROUND OF THE INVENTION

Pleasure boats are built with a wide variety of hull configurations. In fact, the same boat manufacturers may have several hull configurations for different boat models. Each hull configuration, especially those supplied with "strakes" or longitudinal external ribs running the length of the hull, requires a particular support bunk configuration for proper support and to facilitate ease in loading and unloading.

Trailers can be built with a common bunk orientation where a substantial number of similar hulls are to be used. But several different hull configurations are more usually encountered so adjustment provisions are usually manufactured into boat trailers. Such provisions are typically complicated and add significantly to the ultimate cost of the trailer.

The problem therefore encountered by the present inventor is that of providing a boat trailer that may be easily and quickly adjusted to different hull configurations while, at the same time, providing a trailer that is simple in construction and therefore economical for the ultimate user. A solution to this problem is found in the trailer construction disclosed in the following specification. The inventor is not aware of any similar construction, especially in the manner by which the boat hull supporting bunks are adjustably mounted by longitudinal frame members to a wheel supported cross frame carriage.

BRIEF DESCRIPTION OF THE DRAWINGS

The preferred form of the present invention is illustrated in the accompanying drawings, in which:

FIG. 3 is a top plan view of the present trailer showing adjusted positions of the frame members in dashed lines;

FIG. 4 is a side elevation view thereof;

FIG. 5 is a rear elevation view;

FIG. 6 is an enlarged sectional view taken substantially along line 6—6 in FIG. 3;

FIG. 7 is an enlarged sectional view taken substantially along line 7—7 in FIG. 3;

FIG. 8 is a sectional fragmented view taken substantially along line 8—8 in FIG. 2;

DETAILED DESCRIPTION OF THE PREFERRED EMBODIMENT

Figure 1:
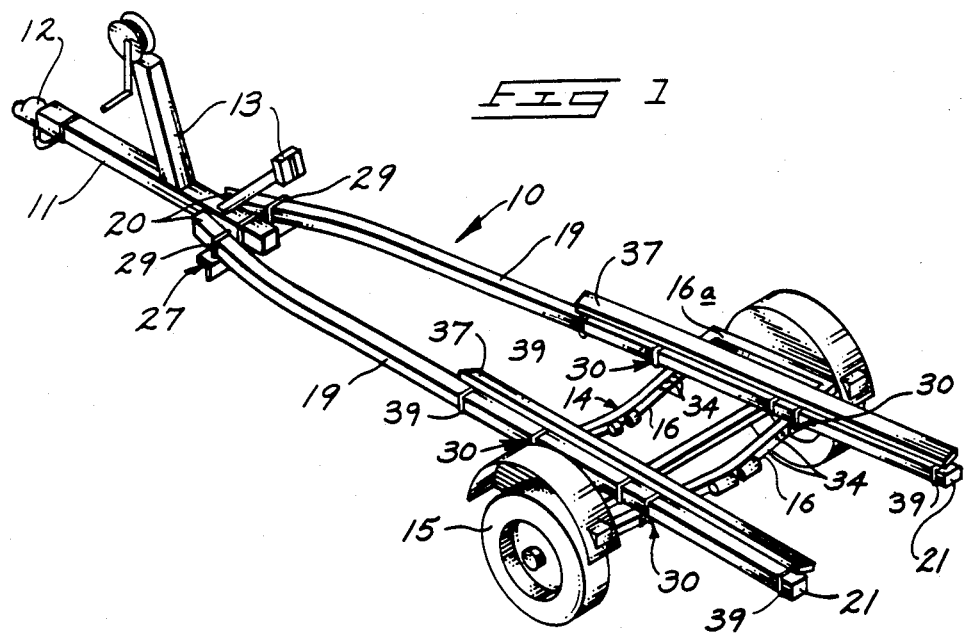
FIG. 1 is a pictorial view of the present trailer.

In compliance with the constitutional purpose of the Patent Laws "to promote the progress of science and useful arts" (Article 1, Section 8), applicant submits the following disclosure of the invention.

The present trailer is generally designated in the drawings by the reference numeral 10. The trailer 10 is provided to movably support a wide variety of pleasure boats having differing hull configurations. To this end, the trailer is provided with novel adjustment provisions that both simplify construction of the trailer and facilitate adjustment for many different hull configurations.

The present trailer includes an elongated tongue 11 at a forward end thereof. The tongue 11 extends longitudinally along the center line of the trailer from a hitch 12 at a forward end to a rearward end. A bow securing means 13 is also mounted to the tongue 11. The securing means 13 may be of any standard configuration including a winch and abutment surface for positioning and securing the bow of a boat on the trailer.

Trailer 10 is supported for movement over the ground surface by a wheeled carriage 14. The carriage 14 may be comprised of a rectangular frame and axle arrangement substantially as shown in FIGS. 1 and 3. It includes a pair of wheels 15 at opposed ends, mounted by an appropriate suspension to the rectangular framework.

The carriage 14 includes a rectangular frame made up of a pair of cross frame sections 16. Each cross frame section 16 includes a substantially V-shaped configuration as shown in FIGS. 1 and 5 with a base or bottom point situated along the longitudinal center line of the trailer. The remote ends of the cross sections 16 are joined by longitudinal carriage frame members 16a which are secured to the standard suspension and axle mechanism for the wheels 15. Details of the suspension and axle are not shown since they are commonly known and commercially available.

The present trailer also includes a pair of elongated frame members 19 that extend from forward ends 20 mounted to the tongue 11 to rearward ends 21 projecting rearwardly of the carriage 14. The frame members 19 are preferably rigid, each being secured by a pivot means 23 to the tongue 11. The frame members are also supported on the carriage 14 by means that enables lateral adjustment of the frame members between positions exemplified in FIG. 3 by solid and dashed lines.

Figure 2:
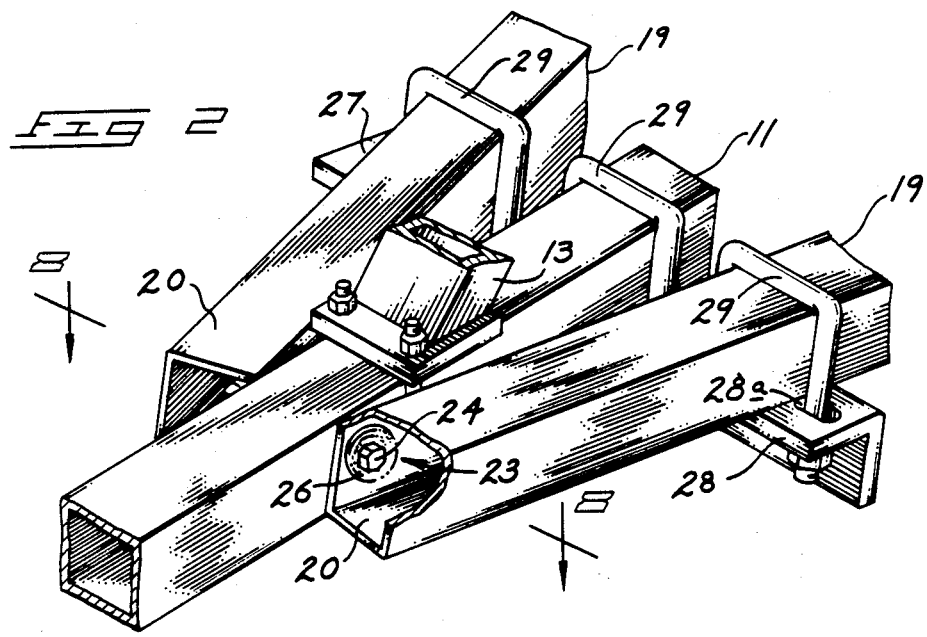
FIG. 2 is a fragmented pictorial view illustrating a portion of the tongue and frame members for the present trailer.

The pivot means 23 is best understood with reference to FIGS. 2 and 8. Pivot means 23 includes a headed bolt assembly 24 that extends through appropriate apertures 25 in tongue 11 and both frame members 19. The pivot means also includes rounded projections 26 that enable pivotal movement of the frame members about pivot points along the bolt axis. The forward frame ends are adjustably held within a horizontal plane by a cross brace means 27.

Pivotal motion of the frame members will occur about points on opposite sides of the tongue 11 where tangential contact is made between the rounded projections 26 and the vertical side walls of the tongue 11 as shown in FIG. 8.

It should be understood that the frame members are not intended to pivot about the axis of the bolt 24, but rather to pivot about the tangential points of contact between the frame members and tongue. Actually, pivotal motion of each frame member will be about an approximate vertical axis passing through the tangential point of contact between the projection 26 and tongue 11.

The cross brace means 27 may be comprised of an elongated slotted bar 28. The bar may extend transversely under the two frame members and the rearward end of the tongue 11. It includes appropriate slots 28a for receiving U-bolt clamps 29. A clamp 29 is provided for each frame member and the rearward end of the tongue. The U-bolt clamps 29 securing the frame members 19 may be selectively released to enable pivotal motion of the frame members along the horizontal plane of the engaged surface of the slotted bar. The U-bolts 29 can also be secured to tightly hold the frame members in a selected position, once proper separation of the frame members has been achieved.

The frame members 19 are adjustably secured to the carriage by a mounting means 30 shown generally in FIG. 1, and more specifically in FIGS. 6 and 7. An alternate version is shown in FIG. 10.

Mounting means 30 includes a pair of brackets 31 for each frame member 19. The brackets 31 of FIGS. 6 and 7 are preferably secured by longitudinal bolt and nut assemblies 32 extending through selected holes 34 evenly spaced along the carriage frame sections 16. The holes 34 along the rearward section 16 (FIG. 6) may be substantially circular. The holes 34 found along a forward section 16 (FIG. 7) of the carriage are slightly elongated to facilitate proper alignment of the frame members and ease in securing the frame members to the carriage at selected adjustment positions.

Figure 10:
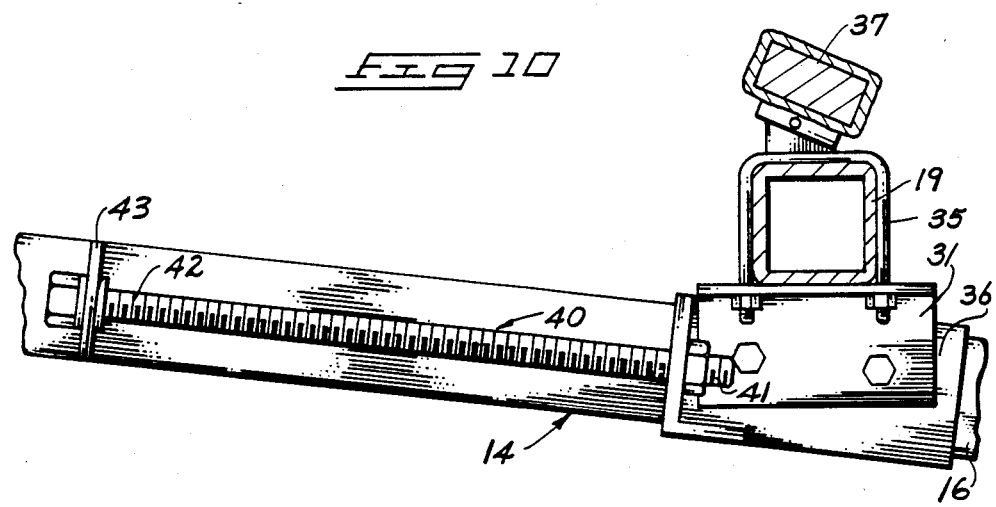
FIG. 10 is a view of an alternate form of adjustment arrangement for the laterally movable frame members of the present invention.

FIG. 10 exemplifies another form of mounting means 30. In this version, one of the brackets 31 on each frame member 19 is mounted to a slide 36 fitted over one of the carriage cross frame sections 16. A nut and bolt arrangement 40 may be provided between the slide 36 and cross frame section 16 as means for adjustably positioning the slide and attached frame members 19 along the cross frame section 16. The nut and bolt arrangement may include a nut 41 secured to the slide 36 and a bolt 42 threadably engaged therewith. The headed end of the bolt 42 may be journalled on the cross frame section 16 by a bracket 43. Bracket 43 will permit rotation of the bolt about an axis parallel with the section 16 but will not allow it to move axially. Rotation of the bolt will thus result in movement of the slide 36 (and attached frame member 19) along the cross frame section 16.

It should be noted that other forms of the mounting means may also be utilized. Various other mechanical linkages, for example, may be used in place of the nut and bolt arrangement shown in FIG. 10 or the mounting bolt arrangement shown in FIGS. 5 through 7.

U-bolts 35 may be provided as means for securing the brackets 31 to the respective frame members 19. The bolts 35 are received over the frame members and are releasably secured by threaded nuts on the brackets to clamp the frame members to the plate. The nuts can be selectively loosened to enable longitudinal adjustment of the wheel carriage along the frame members 19.

Figure 9:
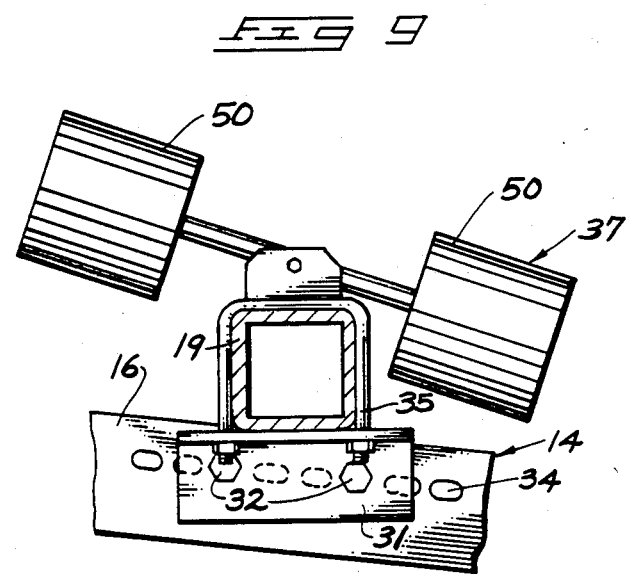
FIG. 9 is a view similar to FIG. 7 only showing a roller arrangement for supporting a boat hull.

Each of the frame members 19 includes a longitudinal bunk means 37 mounted thereon. Each bunk means 37 is mounted by appropriate pivots 39 for pivotal motion about an axis substantially parallel to a frame member 19. The bunk means are provided for receiving and engaging the hull of a boat supported on the trailer. The bunk means may be comprised of a fairly conventional arrangement consisting of elongated flexible frames covered by padded surfaces. Alternatively, the bunk means may be used in other configurations, such as the roller arrangement 50 shown in FIG. 9. Other forms of roller assemblies, walking beam arrangements, etc., might also be utilized as desired. The "bunk means" should therefore be broadly interpreted to include a wide variety of boat hull engaging support devices.

The important consideration is that a bunk means is mounted directly to each frame member 19, and that the frame members 19 are adjustably secured to the carriage 14 and tongue 11. This feature greatly simplifies construction of the complete trailer unit while facilitating adjustment of the bunks for receiving and supporting a great variety of hull configurations.

Another distinct advantage of the above arrangement is the independent nature of the bunks 37, mounting means 30, and U-bolts 35. The independent nature of these elements facilitate complete adjustment of the bunk members toward and away from one another independently of adjustments facilitating longitudinal positioning of the wheel carriage along the frame members 19. Longitudinal motion of the carriage (during adjustment) will not affect bunk position or spacing adjustment between the bunks and frame members. Longitudinal adjustment of the carriage is accomplished simply by loosening the U-bolts 35 to enable movement of the carriage frame longitudinally in relation to the frame members 19. Such adjustment is necessary to enable proper weight distribution along the framework and may be accomplished without affecting the lateral spacing between the bunks as determined by mounting means 30. Adjustments of the carriage along the frame members 19 or adjustments of the frame members on the carriage may be accomplished separately and independently of one another.

Adjustment of the present trailer to accommodate a particular hull configuration consists of several relatively simple operational steps. Firstly, the U-bolt clamps 29 along the cross brace means 27 may be released to enable pivotal motion of the frame members about the points of contact between the rounded projections 26 and tongue 11. The bolts 32 of clamp means 30 are then removed to enable selective lateral motion of the frame members toward or away from one another.

The frame members may then be moved between a first position relatively closely spaced together and a second position spaced further apart. Two representative positions are illustrated by solid and dashed lines in FIG. 3. A selected spacing between the bunks may be determined by the space on a selected boat hull, for example, between selected sets of strakes. Adjustment of bunk spacing is accomplished by adjusting the frame members 19 since lateral adjustment of the frame members causes corresponding adjustment of the bunks 37.

The mounting means 30 can be secured in a selected position by simply reinserting the removed bolt assemblies 32 through appropriate aligned adjustment holes 34 along the carriage sections 16. This action will secure the rearward ends of the frames 19 in position.

After proper lateral spacing of the frame members is achieved, the cross brace means 27 can be retightened to secure the forward ends of the frame members in relation to the tongue. This completes the adjustment procedure. No further adjustment is required unless a boat with a different hull configuration is to be received on the trailer. This may be accomplished simply by repeating the above described procedure for the different hull configuration.

Longitudinal adjustment of the wheel carriage can be easily accomplished once it is determined that the "tongue weight" of the trailer with the boat mounted thereon is inappropriate. To do this, the U-bolts 35 securing the frame members to the wheel carriage are first loosened. The wheel carriage can now be moved forward or backward along the frame members 19, thereby adjusting the "tongue weight" or downward loading at the hitch 12. It is again noted that this step can be accomplished independently of the bunk spacing adjustments indicated above, and that adjustment of the wheel carriage along the frame members 19 will not significantly alter the bunk spacing.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A boat trailer for boats of varied hull configurations comprising:
   a tongue having a forward end for attachment to a towing vehicle;
   a wheel supported carriage;
   a pair of elongated frame members, each having a forward end and a rearward end;
   pivot means mounting the frame members adjacent the forward ends thereof to the tongue for pivotal adjustment along inclined planes converging downwardly between the frame members between a first position with the rearward ends of the frame members spaced apart by a first distance at a first elevation and a second position with the rearward ends of the frame members spaced apart by a second distance and elevation greater than the first distance and elevation;
   means adjustably mounting the frame members to the wheel supported carriage for support thereon at selected positions along the elongated frame members while enabling selective independent lateral adjustment of the frame members while guiding the frame members along the inclined planes between the first and second positions; and
   bunk means mounted to the frame members for adjustable pivotal movement with the frame members between the first and second positions and first and second elevations to accommodate boats with varied hull configurations.

2. The boat trailer of claim 1 further comprising boat bow securing means on the tongue, between the frame members.

3. The boat trailer of claim 1 wherein apertures are formed through the frame members at their forward ends and wherein the pivot means is comprised of a headed bolt for extending through the tongue and apertures formed in the forward ends of the frame members; and
   a cross brace means including clamp members for selectively securing the frame members to the tongue rearward of the pivot means.

4. The boat trailer of claim 1 wherein the wheel supported carriage includes at least one cross member extending between wheels; and
   wherein the means mounting the frame members to the wheel supported carriage is comprised of frame member clamps for releasably securing the frame members to the cross member.

5. The boat trailer of claim 4 wherein the cross member is V-shaped having joined angled sections and wherein the means mounting the frame members to the wheel supported carriage mounts the frame members each to an angled section of the cross member.

6. The boat trailer of claim 1 further comprising bunk pivots mounting the bunk means to the frame members for pivotal movement thereon about axes substantially parallel to the frame members.

7. In a boat trailer:
   a tongue assembly connectible to a towing vehicle;
   a wheel supported carriage;
   a pair of elongated frame members, each having a forward end and a rearward end;
   pivot means for mounting the frame members at their forward ends to the tongue assembly such that the rearward frame member ends can be pivoted toward and away from one another along downwardly converging inclined planes;
   boat supporting bunk means on the frame members for pivotal movement therewith for releasably receiving and supporting a boat;
   mounting means along the frame members for releasably securing the frame members to the wheel supported carriage and for enabling lateral adjustment of the frame members and bunk means toward or away from one another on the wheel supported carriage; and
   wherein the wheel supported carriage is V-shaped having downwardly converging angled sections and wherein said mounting means mounts each frame member to an angled section such that each frame member is simultaneously adjustable both laterally and elevationally.

8. The adjustable bunk frame of claim 7 wherein apertures are formed through the frame members at their forward ends and wherein the pivot means includes a headed bolt extending through the tongue and apertures formed in the forward ends of the frame members; and
   a cross brace means including clamp members for selectively securing the frame members to the tongue rearward of the pivot means.

* * * * *